United States Patent [19]

Barney

[11] 3,835,301

[45] Sept. 10, 1974

[54] CARD CODING AND READ-OUT SYSTEM

[75] Inventor: Walter W. Barney, Encino, Calif.

[73] Assignee: Paul W. Helert, El Cajon, Calif. ; a part interest

[22] Filed: Feb. 21, 1973

[21] Appl. No.: 334,197

[52] U.S. Cl........... 235/61.11 A, 346/74 S, 235/155, 235/61.12 C, 340/173 TP

[51] Int. Cl...... G06k 1/02, G01d 15/08, G06k 7/06, G06f 5/02, G06k 19/06

[58] Field of Search...... 235/61.12 C, 61.11 A, 155, 235/61.9 R, 61.11 D; 346/74 S, 74 SB; 340/173 TP

[56] References Cited

UNITED STATES PATENTS

| | | | |
|---|---|---|---|
| 3,218,647 | 11/1965 | Fenner | 346/74 S |
| 3,344,412 | 9/1967 | Goodale | 340/173 TP |
| 3,373,270 | 3/1968 | Fenner | 235/155 |
| 3,641,318 | 2/1972 | Tollet | 235/61.12 C |

*Primary Examiner*—Daryl W. Cook
*Assistant Examiner*—Robert M. Kilgore
*Attorney, Agent, or Firm*—Ralph B. Pastoriza; Pastoriza & Kelly

[57] ABSTRACT

A card may be provided with an invisible code and the same apparatus employed for coding the card can be used to read back the code on the card and convert it to a display of information defined by the code. The coding of the card is accomplished by subjecting selected points of the card to a high voltage which causes a current to flow through the selected points and render them more conductive than remaining portions of the card. The selected points rendered more conductive are invisible to the naked eye and the physical appearance of the card is in no way impaired. In reading out the code, a lesser voltage is applied to all points on the card and only those points rendered more conductive will pass current to provide electrical signals for operating a suitable read-out, print-out, computer input, or for otherwise retrieving the information.

2 Claims, 3 Drawing Figures

CARD CODING AND READ-OUT SYSTEM

This invention relates generally to coding and decoding systems for identification or security purposes and more particularly to such systems as applied to credit cards, security badges and the like.

BACKGROUND OF THE INVENTION

Different types of coding and decoding systems for storing information to be subsequently retrieved are well known in the art. Typical examples include IBM punchcards, storage of bits of information on magnetic tape, the use of specially designed characters on cards or checks that may be read electronically, and so forth. In the field of credit cards, an identification number is normally embossed on the card for easy reproduction and visual reading. In certain types of security cards, portions are provided with magnets which are hidden within the card for security purposes and form a specific pattern which may be utilized to unlock a door or perform similar security operations.

All of the foregoing systems have been highly successful. However, they all normally require a special type of material for the card such as vinyl, plastic and mylar which are laminated and the associated equipment for coding the card and decoding the card depending upon the degree of sophistication can become expensive. In the particular case of hidden or invisible coding of a simple card, the manufacture of the card itself can become a sizable factor in the overall costs.

BRIEF DESCRIPTION OF THE PRESENT INVENTION

With the foregoing in mind, the present invention contemplates a method and apparatus for coding and decoding a card such as a credit card or a security badge wherein the code itself is completely invisible and yet the manufacture of the card can be carried out extremely economically; for example, special but inexpensive paper stock can be utilized for this purpose.

For convenience in describing the present invention, the particular material on which information is to be coded and subsequently decoded will be referred to as a card; for example a credit card which is normally 2⅛ inches by 3⅜ inches. It is to be understood, however, that this card or other suitable material is deemed to be included in the term "card." Further, the term is to be understood as also including equivalent type media wherein it might be desired to provide invisible codes for identification or security purposes such as in passports, security badges and the like.

In accord with the method of the invention, an electrical current under a given voltage is passed through specific selected points among an array of points physically spaced on the card or medium provided for carrying the coded information to render the selected points electrically more conductive than the remaining portions of the card. The points selected define a code of the particular information to be stored in the card in much the same way that the particular selected points punched out in a punch type card are utilized to store information. In the present invention, however, the selected points rendered more conductive than the remaining portions of the card are not in any way visible to the naked eye.

The coded card information may sebsequently be retrieved or read by subjecting all of the points to a voltage substantially less than the given coding voltage such that only those points rendered more conductive than the remaining portion of the card pass current to provide electrical signals corresponding to the selected points. These signals can then be used to operate any suitable read-out or print-out device to display the information originally defined by the code. These same signals can also be used to feed the input to a computer, memory bank, or other equipment in order to yield the information.

A feature of the invention resides in the fact that the particular apparatus for carrying out the basic coding method can also be used to decode and read-out the information on the card. Since the method and apparatus can be used with special inexpensive paper stock, great economy in the manufacture of the cards themselves is realized. In fact, a card completely coded and printed on both sides can be manufacutred for less than one fourth the cost of a conventional plastic laminated card prior to any coding. One reason for this economy is the fact that the card of this invention requires no lamination and can be as thin as 0.005 inch or even thinner.

BRIEF DESCRIPTION OF THE DRAWINGS

A better understanding of the method and apparatus of this invention will be had by referring to the accompanying drawings in which.

DETAILED DESCRIPTION OF THE INVENTION

Figures 1, 2:
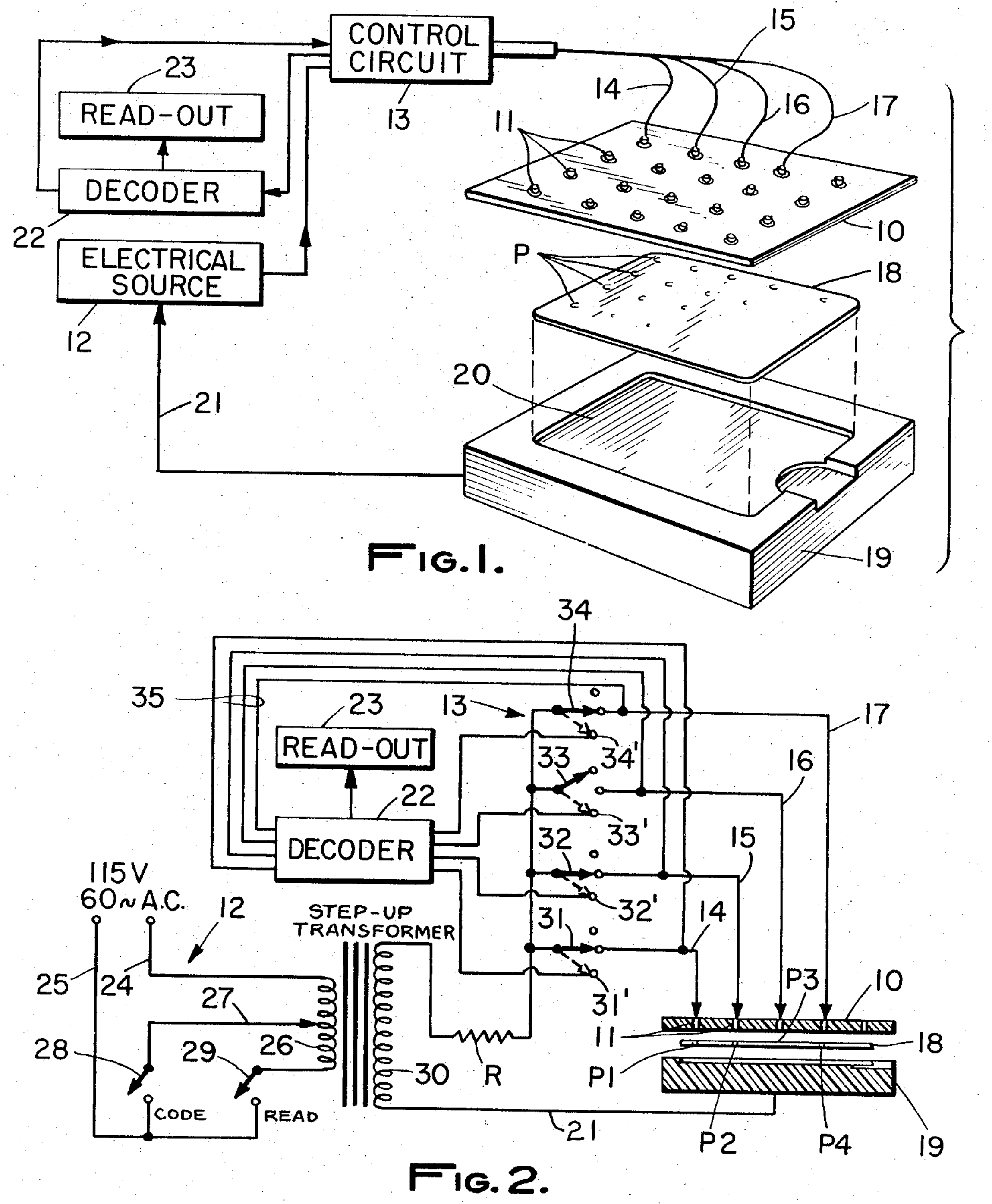
FIG. 1 is an exploded view of an apparatus for coding and decoding a card showing portions in block diagram form.
FIG. 2 shows in greater detail certain circuit portions of the system of FIG. 1; and, FIG. 3 is an enlarged fragmentary cross section of the card or material on which a code is provided.

Referring to FIG. 1 one type of apparatus for coding a credit card with information is illustrated and includes an insulative plate 10 provided with an array of electrical contacts 11. The array defines an area corresponding to the area of a portion of a credit card on which information is to be recorded.

An electrical source 12 provides a given voltage to a control circuit 13 which in turn includes means for individually connecting the source to selected ones of the electrical contacts in accord with a code defining information to be recorded. The individual connections to the contacts are illustrated by conductors 14, 15, 16 and 17 by way of example. It will be understood that all of the contacts have an associated individual electrical connection from the control circuit 13. The selected contacts to which the given voltage is to be applied might, for example, be contacts 14, 15 and 17.

Shown below the insulated plate 10 is a credit card 18 including an array of points P which simply constitute physical locations on the card which fall directly beneath the various contacts 11 when the apparatus is assembled.

A base platen 19 includes a receiving area 20 for the card 18. In the embodiment illustrated, the base platen 19 is conductive and serves as a return circuit to the source 12 as indicated by the line 21.

The system is completed by the provision of a decoder 22 and read-out 23 associated with the control circuit 13 as shown.

Referring now to FIG. 2, further details of the apparatus will be evident.

Referring to the lower left portion of FIG. 2, the electrical source 12 includes input power leads 24 and 25 which may be connected to a conventional 115 volt 60 cycle A.C. source. A primary coil 26 of a step-up transformer has its upper end connected to the power lead 24 and includes a tap 27 terminating in a switch arm 28. The lower end of the coil in turn connects to a switch arm 29. Power lead 25 in turn terminates in terminals designated code and read associated with the switch arms 28 and 29 respectively. The secondary coil 30 for the transformer has its upper end connected through a current limiting resistance R to a plurality of switch arms 31, 32, 33 and 34. Selected ones of these switch arms may be closed to connect the transformer to the connecting leads 14, 15, 16 or 17.

In FIG. 2, the credit card 18 is shown sandwiched between the insulative plate 10 and the base platen 19. The return lead 21 connects to the lower side of the secondary coil 30 of the step-up transformer.

When the switch arms 31 through 34 are moved to their dotted line positions, they engage terminals 31' through 34' respectively to place the decoder 22 in series with the electrical leads 14 through 17.

In FIG. 2, points on the card 18 falling directly beneath the array of contacts 11 and associated with the leads 14 through 17 are designated P1, P2, P3 and P4.

Figure 3:
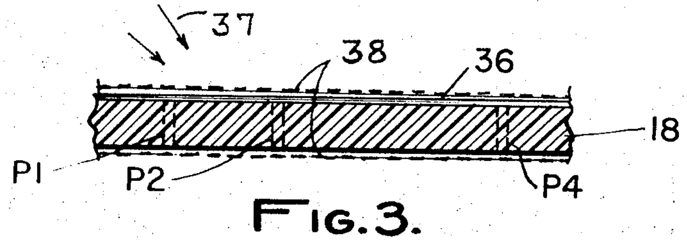

In the enlarged fragmentary cross-section of FIG. 3, it will be noted that the credit card 18 may be provided with a coating 36 on its surface which may be a photographic emulsion so that a photograph of a person may be directly developed on the card. In this respect, since a regular photographic print constitutes paper stock, the physical print itself may be readily coded with the apparatus of this invention.

OPERATION

In operation, a credit card or other paper stock or material to be coded is positioned in the receiving area 20 of the base platen 19 as described in FIG. 1. The insulative plate 10 is then positioned on top of the card to sandwich the card between the plate and platen. It will be understood, of course, that the arrangement is such that consistent registration of the array of contacts 11 relative to a given area on the card is maintained.

With the card in position as shown in FIG. 2, certain of the switch arms 31 through 34 are closed thereby selecting certain ones of the contacts 11 to which a given voltage is to be applied. In the example of FIG. 2, the switch arms 31, 32 and 34 are shown as closed, the switch arm 33 remaining open. After selecting the various contacts to be energized in accord with a code defining certain information, the code switch arm 28 on the primary of the step-up transformer is closed thereby providing a high voltage on the secondary. In this respect, the center tab arrangement on the primary merely enables a single step-up transformer to be used to provide two distinctly different output voltages on the secondary. Thus if the read switch arm 29 is closed a substantially lower voltage will appear on the secondary winding 30.

The given high voltage is transferred to the leads 14, 15 and 17 through the closed switch arms to cause a current to pass through the selected points which, in the example shown, would constitute points P1, P2 and P4 on the card 18. Essentially, the high voltage alters the material at the specific points in the card to render the points more conductive than the remaining portions of the card. The alteration occuring may be chemical or physical. The selected given voltage, however, is controlled so as not to alter the points on the card to the extent that such alteration would be visible to the naked eye.

The card 18 may then be removed from between the insulative plate 10 and base platen 19 and it will in all essential respects appear unchanged.

To decode the information on the card, it may be placed back between the insulative plate 10 and base platen 19. All of the various switch arms 31 through 34 are then moved to their dotted line positions to engage the contacts 31' through 34' respectively. The read switch arm 29 on the primary of the transformer is then closed to provide a substantially lower voltage on the secondary 30. This lower voltage energizes all of the connecting contact leads 14 through 17 through the decoder 22. However, a circuit is only completed to the base platen 19 through the selected points on the card which have been rendered more conductive; that is, the points P1, P2 and P4. Accordingly, current will only flow in the leads 14, 15 and 17. These currents or electrical signals are detected in the decoder 22, the decoder being placed in series with the leads when the switch arms 31 through 34 are in their dotted line positions. The read-out 23 is responsive to the electrical signals to display information originally defined by the code.

It will be understood that the substantially lower voltage applied to the points on the card during the read-out process is not sufficient to render points on the card more conductive than the remaining portions on the card but only sufficient to assure that a current will flow through the particular points previously rendered more conductive by the high voltage applied.

In an actual prototype of the invention, the card was made up of special but inexpensive paper supplied by Appleton Coated Paper Co., Appleton, Wis., under the trademark ASCOT. This paper is of high strength and durability as well as being resistant to ultra violet light, humidity, tearing, curling, shrinking or fraying.

Using a 0.015 inch thick piece of this paper, a given high voltage in the neighborhood of 8,000 volts, 60 cycle, a.c. worked well for coding the paper without leaving any indications visible to the naked eye that the paper had been altered. The lower decoding voltage for reading out the information on this same paper was between 2,000 and 3,000 volts, 60 cycle, a.c.

The above voltage values, of course, will vary for different thicknesses of paper. In fact, in the general case, the voltage values will depend not only on the thickness, but on the dielectric constant of the paper medium and the frequency of the voltage signal. This frequency could vary from zero (d.c. voltage) to frequencies greater than that provided by the normal 60 cycle, a.c. supplies.

In accord with the invention it is possible to spray the card on one or both sides with a thin acrylic or clear lacquer, by way of example, without affecting the reading of the code. This spraying is indicated by the arrows 37 in FIG. 3, and offers good protection for the card without nullifying the code.

On the other hand, should it be desired to nullify the code so that the same card can be recoded with a different code, the card can be coated on both sides, for example, with liquid polystyrene or corona dope with silicone. This coating will nullify the code previously on the card by blocking, in effect, any current flow through the coded points when the read-out low voltage is applied. However, it will not block the higher coding voltage so that the card can be recoded.

The coatings described are indicated by the dashed lines 38 on the card of FIG. 3.

As a specific example of a very simple coding and decoding, assume that the numerals 1, 2, 3 and 4 are associated with the leads 14, 15, 16 and 17 respectively. By selecting the points P1, P2 and P4, the card 18 would bear a code indicating the number 124.

The read-out 23 may include a digital display such as a series of Nixie tubes or equivalent read-outs such as light emitting diodes which when energized will display a given numeral. In reading back the code on the card, the electrical signals in the leads 14, 15 and 17 will thus energize the appropriate terminals on the digital read-out, the decoder 22 passing these particular signals to the associated read-out components. The number 124 will thus be displayed on the read-out. Alternatively a print out could be used.

It will be understood that in an actual embodiment of the invention, there will be provided many more than simply four leads and four contacts. A credit card of dimensions of 2⅛ inches by 3⅜ inches can encompass a very large of points in a suitable array. The selection of various points can be effected in a binary fashion so that a non-conductive point might indicate zero and a point rendered conductive the numeral 1. It will thus be appreciated that thousands of bits of information can readily be coded on the card by a simple binary system.

The decoder and read-out would then simply convert the binary code into its original form to display the original information coded. In this respect, conventional computer equipment already available can be utilized and would be compatible with the present system.

While the particular switching for the control circuit described in FIGS. 1 and 2 for applying the given voltage to selected points has been indicated simply as switch arms, it will, of course, be understood by those skilled in the art that high speed electronic switches could be used, there being provided an individual switch for each specific contact in the insulative plate 10.

From the foregoing description, it will be evident that the present invention has provided a novel and unique simplified coding and decoding system which will work with most types of paper stock product so that few limitations are placed on the type of material which is to carry the code. Thus, the particular paper must be essentially non-conductive but characterized in that portions can be rendered more conductive when subjected to the given high voltage. As stated, most conventional paper stock products have this characteristic as well as some plastic products.

I claim:

1. An apparatus for coding a credit card with information comprising, in combination:

a. an insulative plate supporting an array of electrical contacts defining an area corresponding to the area of a portion of a card on which information is to be recorded;

b. a source of electrical energy providing a given voltage;

c. control circuit means for individually connecting said source to selected ones of said electrical contacts in accordance with a code defining information to be recorded;

d. a base platen defining a credit card receiving area on its top surface such that a credit card may be positioned on said receiving area and sandwiched between said insulative plate and base platen to assure a consistent registration and avoid any relative motion between said array of electrical contacts and the area on the portion of the card on which information is to be recorded, said base platen constituting part of a return electrical circuit to said source, whereby the individual points among all of the points in the portion of the card on which information is to be recorded which are engaged by the selected contacts may be altered simultaneously relative to the remaining points on the card to render them more conductive by connection of the source of electrical energy to the selected contacts, said given voltage and control circuit means being such as to provide a current through said individual points sufficient to effect the alteration into a more conductive state without rendering the individual points on the card visible to the naked eye, said control circuit means including;

e. means for supplying a voltage to all of said contacts simultaneously which is substantially lower than said given voltage;

f. means connected to the individual contacts responsive simultaneously to current flows therein to provide electrical signals indicative of those particular contacts through which current is flowing; and g. read-out means responsive to said signals to provide a display of information corresponding to the information originally coded in the card, whereby said apparatus may be used to read-out coded information on the card by subsequently sandwiching the card between said insulative plate and base platen and applying said voltage to all of said contacts, only those contacts in engagement with points which have been rendered more conductive having current flowing therethrough to provide said electrical signals.

2. An apparatus according to claim 1, in which said credit card may have an emulsified surface for printing of a photograph thereon.

* * * * *